SIMPLIFIED PIEZORESISTIVE FORCE SENSING DEVICE

Filed June 29, 1966 2 Sheets-Sheet 1

Inventor:
Gunther E. Fenner,
by Marvin Snyder
His Attorney.

Dec. 17, 1968 G. E. FENNER 3,417,322

SIMPLIFIED PIEZORESISTIVE FORCE SENSING DEVICE

Filed June 29, 1966 2 Sheets-Sheet 2

Inventor:
Gunther E. Fenner,
by Marvin Snyder
His Attorney.

United States Patent Office 3,417,322
Patented Dec. 17, 1968

3,417,322
SIMPLIFIED PIEZORESISTIVE FORCE SENSING DEVICE

Gunther E. Fenner, Schenectady, N.Y., assignor to General Electric Company, a corporation of New York Filed June 29, 1966, Ser. No. 561,472
12 Claims. (Cl. 323—75)

ABSTRACT OF THE DISCLOSURE

A transducer comprising a single semiconductor crystal having at least two parallel piezoresistive elements formed on a single face lying in a plane which is both perpendicular to the direction of a first of two forces applied to the crystal and parallel to the direction of the second of these forces. The elements are situated with respect to the longitudinal axis of the face such that they are affected identically in response to the first force and differently in response to the second force.

This invention relates generally to transducer devices which convert two-dimensional mechanical displacements into electrical signals, and more particularly to a simplified force sensing device comprising a piezoresistive crystal having active regions formed on but one of the crystal faces and being adaptable for use as a stereophonic phonograph pick-up.

Many methods have heretofore been suggested for converting sound recorded on a stereophonic phonograph record into electrical signals for reproducing the sound. Perhaps the most common form of transducer now in use for that purpose is one utilizing the piezoelectric effect. Thus, a stylus is used to obtain a mechanical displacement from the sound recorded on the phonograph record and the mechanical displacement of the stylus is transferred to the piezoelectric transducer which produces an electrical output when strained by this displacement. The electrical signals obtained from the piezoelectric element are then used to reconstruct the recorded audio signal.

While piezoelectric elements have been used quite extensively and are generally satisfactory, the advance of technology has somewhat limited their usefulness. In particular, the increased use of transistors and other solid state devices has opened the way to increasingly compact circuitry. However, while a transistor amplifier needs a relatively low value of generator impedance, or output impedance, to operate most effectively, piezoelectric transducers exhibit a generator impedance which is too high to permit the most effective use of transistor amplifiers. Usually, two transistors in cascade are required in order to reduce the generator impedance of a piezoelectric transducer to a level which matches the input impedance of a transistor amplifier.

To obivate the aforementioned difficulties associated with piezoelectric transducer devices, it has been proposed to utilize piezoresistive elements as phonograph pick-ups. One such pick-up highly suitable for such purpose is that shown and described in G. E. Fenner application, Ser. No. 422,623, filed Dec. 31, 1964, now Patent No. 3,378,648, issued Apr. 16, 1968, and assigned to the instant assignee. The pick-up of the aforementioned Fenner application, wherein active regions are formed on each of two faces of a piezoresistive crystal, demonstrates the feasibility and advantages of utilizing piezoresistive transducer elements instead of piezoelectric transducer elements as phonograph pick-ups.

Any mass market for stereophonic phonograph pick-ups requires high quality transducers which can be quickly and cheaply manufactured. Thus, while the transducer of aforementioned Fenner application meets these criteria, it would be desirable to further simplify manufacture of these transducers, without making any sacrifice at all in quality. This is accomplished in the instant invention by forming the active regions of a stereophonic piezoresistive transducer on but a single face of the piezoresistive crystal, instead of on two faces thereof.

Accordingly, one object of this invention is to provide a simplified stereophonic phonograph pick-up which permits optimization of transistorized circuitry in a phonograph reproducer.

Another object is to provide a simplified stereophonic phonograph pick-up having a low generator impedance.

Another object is to provide a piezoresistive force sensing device which may be mass produced quickly and simply.

Briefly, in a preferred embodiment of the invention, there is provided a force sensing device comprising a semiconductor crystal having a plurality of faces, with one of the faces lying in a plane perpendicular to the direction of a first of two applied forces and parallel to the direction of the second of the forces. At least two parallel strips are provided and are directed longitudinally along the one face. These strips, which comprise low resistivity portions of the semiconductor crystal, are directed orthogonally to the direction of each of the applied forces. Resistance values of the strips are affected substantially identically in response to the first of the two applied forces and differently in response to the second of the two applied forces.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

Figures 1, 2, 3, 4, 5, 6:
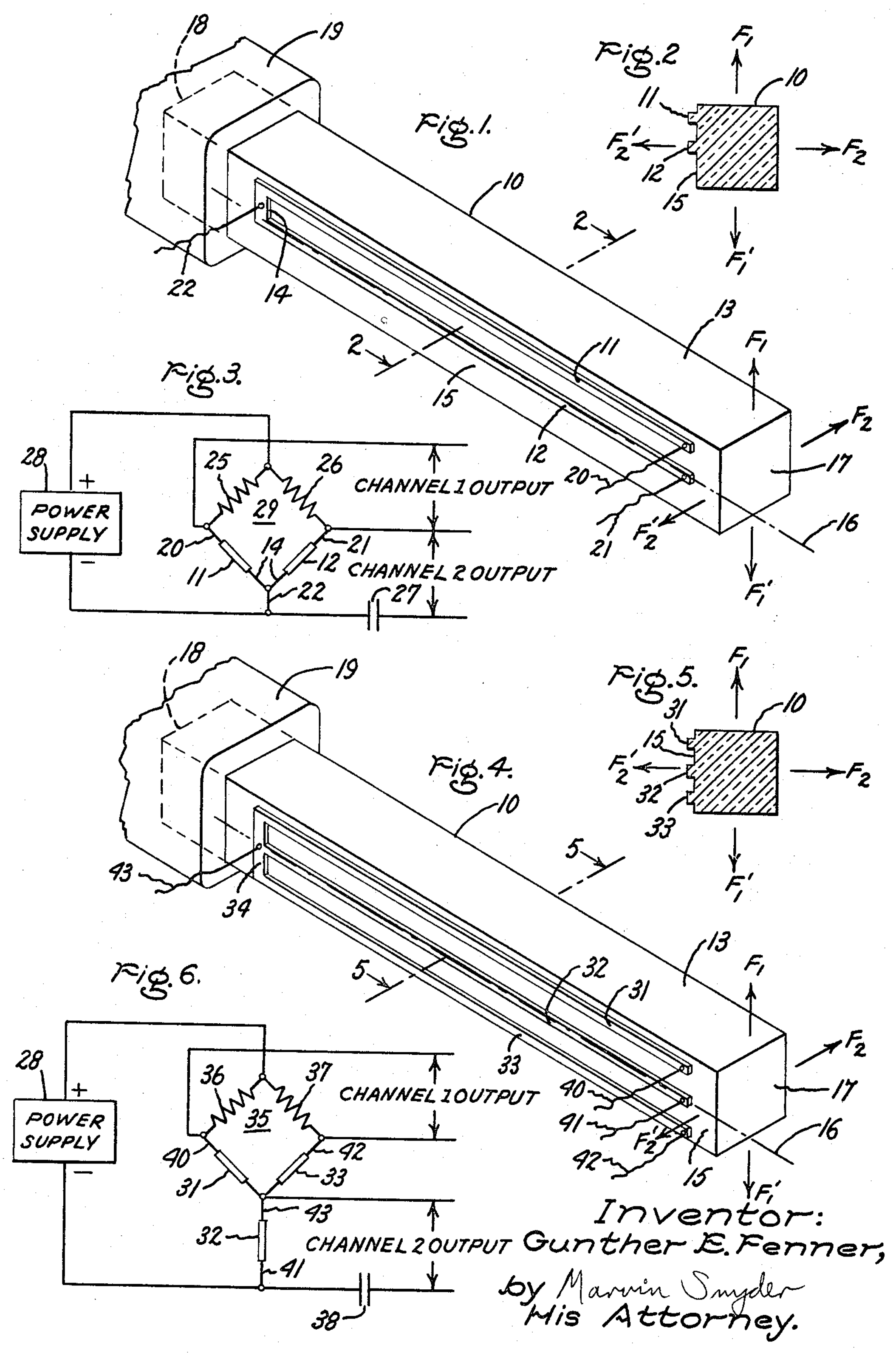
FIGURE 1 is an isometric view of one embodiment of the invention.
FIGURE 2 is a cross-sectional view of the embodiment of FIGURE 1, taken along line 2—2.
FIGURE 3 is a circuit diagram showing how the embodiment of the invention illustrated in FIGURES 1 and 2 may be connected in an operative manner.
FIGURE 4 is an isometric view of a second embodiment of the invention.
FIGURE 5 is a cross-sectional view of the embodiment of FIGURE 4, taken along line 5—5.
FIGURE 6 is a circuit diagram illustrating how the embodiment of the invention illustrated in FIGURES 4 and 5 may be connected in an operative manner.

In FIGURE 1, a single semiconductor crystal 10 is shown having epitaxially deposited low resistivity strips or elements 11 and 12 on a single face 15 thereof, joined by an epitaxially deposited low resistivity strip 14. Crystal 10 is preferably formed in the shape of a rectangular bar or wafer with dimensions approximating those of prior art piezoelectric transducers, and is comprised of high resistivity wide band-gap seminconductor material capable of achieving a large range of resistivity at room temperature, such as silicon, germanium, or gallium arsenide-phosphide (such as described in Ehrenreich and Fenner application, Ser. No. 336,309, filed Jan. 7, 1964, now Patent No. 3,270,562, issued Sept. 6, 1966 and assigned to the instant assignee). The ratio of resistivity of the high resistivity material to the low resistivity material should preferably be greater than $10^4$. Thus, the band-gap of the semiconductive material must be sufficiently wide so that the concentration of intrinsic charge carriers is not too great to prevent achieving the required high resistivity at room temperature in crystal 10, while yet allowing establishment of low resistivity zones by use of high doping levels. The aforementioned semiconductor materials suitably met these criteria. Moreover, addition of the doping impurities aids in confining transducer current primarily to elements 11, 12 and 14, thereby minimizing power loss. For illustrative purposes, the material of crystal 10 will hereinafter be described as silicon. With silicon, a resistivity in excess of approximately 10,000 ohm-centimeters may be attained by diffusion of a deep-level impurity, such as copper or gold, into the wafer.

Element 12 is deposited along the longitudinal centerline 16 of surface 15, while element 11 is deposited on surface 15 parallel to centerline 16 but displaced therefrom. Strip 14 is deposited perpendicularly to centerline 16 close to one end 18 of crystal 10, which is constrained within a material 19, such as rubber. The opposite end 17 of crystal 10 is unconstrained, to permit displacement in response to movement, in two dimensions, of a stylus (not shown) affixed to the crystal at end 17.

Elements 11, 12 and 14 are epitaxially deposited by conventional methods, such as the process described in W. C. Dash, Patent No. 3,232,799, issued Feb. 1, 1966, and assigned to the instant assignee, and may be doped with either acceptor or donor type impurities. For purposes of illustration, it is hereinafter assumed that elements 11, 12 and 14 are doped with donor or N-type impurities, such as phosphorus, so as to provide these elements with low resistivity. In the alternative, however, it may prove advantageous to diffuse elements 11, 12 and 14 into crystal 10, in the manner shown and described, for example, in G. E. Fenner Patent No. 3,378,648, issued Apr. 16, 1968, and R. N. Hall application, Ser. No. 161,964, filed Dec. 26, 1961, now Patent No. 3,292,128, issued Dec. 13, 1966, both of which applications are assigned to the instant assignee. To assure that strip 14 is of low resistance, it may be fabricated to have greater width than strips 11 and 12.

In general, the piezoresistive effect in semi-conductive materials is anisotropic. Thus, orientation of the crystallographic axes is selected advantageously to maximize the piezoresistive effect in most cases. For example, the longitudinal axis of transducer 10, which runs in the direction of centerline 16, is preferably selected to coincide with the (100) crystallographic axis for N-type silicon, as is assumed here, or with the (111) crystallographic axis in the case of P-type silicon. The dependence of the piezoresistive effect on the aforementioned crystallographic axes is discussed in greater detail in Keyes, The Effects of Elastic Deformation on the Electrical Conductivity of Semiconductors, Solid State Physics, volume 11, pages 149–221, (1960), Academic Press, Inc., New York.

A change in resistance of element 11 is brought about by a vertical (with respect to the drawing) bending force $F_1$ or $F_1'$, applied to end 17 of crystal 10. However, element 12 is subjected to neither tensile nor compressive stresses by forces $F_1$ and $F_1'$ since this element lies directly along longitudinal axis 16 of face 15. Thus, for a negative piezoresistive cofficient, as is assumed here, force $F_1$ produces a compressive stress on element 11, which responds by increasing in resistance. Conversely, force $F_1'$, which acts in the opposite direction, produces a tensile stress on element 11, which consequently decreases in resistance.

A horizontal (with respect to the drawing) bending force $F_2$, which acts on end 17 of crystal 10 and is orthogonal to forces $F_1$ and $F_1'$, produces equal tensile stresses on elements 11 and 12, while a horizontal bending force $F_2'$, acting in the opposite direction, produces equal compressive stresses on elements 11 and 12. Thus, force $F_2$ causes a decrease in resistance of elements 11 and 12 by equal amounts, while force $F_2'$ causes an increase in the resistance of elements 11 and 12 by equal amounts. Forces $F_1$, $F_1'$, $F_2$ and $F_2'$ leave the resistance of strip 14 unaffected, since this strip is situated sufficiently close to the constrained end of bar 10 to preclude appreciable strain in the strip due to any of these forces. The sectional view shown in FIGURE 2, wherein like numerals indicate like components, illustrates the relationship between epitaxially deposited elements 11 and 12 and forces $F_1$, $F_1'$, $F_2$ and $F_2'$.

In order to respond to the aforementioned changes in resistance of active piezoresistive elements 11 and 12, leads 20 and 21 are attached to the ends of elements 11 and 12, respectively. Similarly, a lead 22 is connected to the center of strip 14. The contacts made between leads 20–22 and the elements to which they are respectively connected are ohmic or nonrectifying, in accordance with any of the conventional methods known in the art.

After leads are attached to the piezoresistive elements of FIGURE 1, connections are made in accordance with the circuit of FIGURE 3 in order to obtain two separate signals in response to the vertical and horizontal forces applied to crystal 10 close to end 17. Thus, the nonjoined ends of elements 11 and 12 are connected in a bridge circuit configuration 29 through a pair of resistances 25 and 26. Because elements 11 and 12 are uniformly produced, their resistances are equal when no force is applied to end 17 of crystal 10. Hence, in order to balance the bridge, resistances 25 and 26 must be equal for equal resistances of elements 11 and 12, respectively, neglecting the negligible lead resistances and resistance of strip 14. A D.C. potential with respect to lead 22 is applied to the bridge terminal common to resistances 25 and 26 from power supply 28. Output voltage for a first channel, designated channel 1, is taken from across leads 20 and 21, while output voltage for a second channel, designated channel 2, is taken from across leads 21 and 22. A D.C. blocking capacitor 27 may be inserted in either channel 2 lead, in event it is desired to remove D.C. bias from the output signal of channel 2. Channel 1 receives no D.C. bias voltage since, when the bridge is balanced, the D.C. voltages across elements 11 and 12 cancel each other in the channel 1 output or signal path. Hence, no D.C. blocking means are required for channel 1.

The circuit of FIGURE 3 permits variations in resistance of element 11 to affect only the channel 1 output voltage, and variations in resistance of element 12 to affect only the channel 2 output voltage. Therefore, those changes in resistance of element 11, which are due solely to forces acting in the $F_1$ or $F_1'$ directions, provide input voltages to amplifying apparatus for channel 1 (not shown). Similarly, changes in resistance of element 12, which are due solely to forces acting in the $F_2$ or $F_2'$ directions, cause a variation in voltage across leads 20 and 21, which is applied to amplifying apparatus for channel 2 (not shown).

It can be seen that forces $F_1$ and $F_1'$ act only on element 11, leaving element 12 unaffected thereby, while forces $F_2$ and $F_2'$ act in the same manner on both elements 11 and 12. Therefore, in the presence of forces $F_1$ or $F_1'$ only, the voltage across element 11 in the bridge configuration of FIGURE 3 varies. This causes a variation in voltage across leads 20 and 21, which manifests itself as an A.C. potential on the channel 1 output leads of the bridge circuit. The channel 2 output of the bridge circuit remains unaffected thereby, since the resistance of element 12 remains constant.

On the other hand, a force $F_2$ or $F_2'$ applied to crystal 10 acts uniformly on both elements 11 and 12. Thus, the voltage across either element varies identically with voltage across the other, so that the voltage across leads 20 and 21 remains constant. In this event, no channel 1 A.C.

output voltage is produced by the bridge circuit. However, since the channel 2 output voltage of the bridge configuration is supplied across leads 21 and 22 in series with blocking capacitor 27, and since the voltage across element 12 varies with forces $F_2$ and $F_2'$, an A.C. voltage varying in accordance with these forces only, appears on the channel 2 output portion of the bridge circuit shown in FIGURE 3. In this fashion, channel separation is achieved, since forces $F_1$ and $F_1'$ have an effect only on channel 1, while forces $F_2$ and $F_2'$ have an effect only on channel 2. It should also be noted that the circuit of FIGURE 3 produces equal output voltage changes on channels 1 and 2 for equal resistance changes of elements 11 and 12 respectively. Since elements 11 and 12 are fabricated to have identical physical properties, equal vertical and horizontal forces applied to crystal 10 close to end 17 can be made to produce equal output voltage changes for channels 1 and 2 by dimensioning crystal 10 so that the strain in element 11 produced by any given value of vertical force is equal to the strain in element 12 produced by the same given value of horizontal force.

FIGURE 4 is a second embodiment of the invention, wherein three active elements or strips 31, 32 and 33 are present on a single face 15 of crystal 10, and are joined by a strip 34. Element 32 is deposited along longitudinal centerline 16 of surface 15, while elements 31 and 33 are deposited equidistant from and parallel to centerline 16. Strip 34 is situated normal to centerline 16 close to constrained end 18 of crystal 10. Elements 31–34 are doped with proper conductivity-inducing type impurities so as to exhibit low resistivity, and may be produced by well-known methods such as epitaxial deposition, or diffusion. As previously mentioned, the longitudinal axis of transducer 10, which runs in the direction of centerline 16, is preferably selected to coincide with the (111) crystallographic axis for P-type silicon, or with the (100) crystallographic axis in the case of N-type silicon as herein assumed.

A change in resistance of elements 31 and 33 is brought about by a bending force $F_1$ or $F_1'$ applied to crystal 10 close to end 17. Since elements 31 and 33 are equally spaced on opposite sides of centerline 16, their resistance changes in response to forces $F_1$ and $F_1'$ are equal in magnitude but opposite in polarity. However, element 32 is nonresponsive to forces $F_1$ and $F_1'$, since this element coincides with centerline 16. Thus, assuming N-type active elements, force $F_1$ produces a compressive stress on element 31 and a tensile stress on element 33, so as to increase resistance of element 31 and decrease resistance of element 33, in equal amounts. Conversely, force $F_1'$ produces a compressive stress on element 33 and a tensile stress on element 31, so as to increase resistance of element 33 and decrease resistance of element 31, in equal amounts.

On the other hand, a force $F_2$, which is orthogonal to forces $F_1$ and $F_1'$, produces tensile stresses on each of elements 31, 32 and 33, while a force $F_2'$, acting opposite to force $F_2$, produces compressive stresses on elements 31, 32 and 33. Thus, force $F_2$ causes a decrease in resistance of elements 31, 32 and 33 by equal amounts, while force $F_2'$ causes an increase in resistance of elements 31, 32 and 33 by equal amounts. Neither of the horizontal and vertical forces produces a change in resistance of strip 34, since this strip is situated sufficiently close to the constrained end of bar 10 to preclude appreciable strain due to these forces. The sectional view shown in FIGURE 5, wherein like numerals indicate like components, illustrates the relationship between elements 31, 32 and 33, when epitaxially deposited, and forces $F_1$, $F_1'$, $F_2$ and $F_2'$.

Leads 40, 41 and 41 are attached to the nonjoined ends of elements 31, 32 and 33 respectively, and a lead 43 is connected to the center of strip 34. The contacts made between leads 40–43 and the elements to which they are respectively connected are ohmic or nonrectifying. The leads thereby attached to the piezoresistive elements of the crystal shown in FIGURE 4 are connected in accordance with the circuit configuration of FIGURE 6. Thus, the nonjoined ends of elements 31 and 33 are connected in a bridge circuit configuration 35 with a pair of resistances 36 and 37 respectively. A D.C. potential with respect to lead 41 is applied to the bridge terminal common to resistances 36 and 37 from D.C. power supply 28, so that current supplied to resistances 31 and 33 flows through element 32. Because elements 31, 32 and 33 are uniformly produced, their resistances are equal when no force is applied to crystal 10 close to end 17. Thus, to balance the bridge, resistances 36 and 37 must be equal for equal nonstrained resistance values of any of elements 31–33. A D.C. blocking capacitor 38 may be connected to lead 41, in event it is desired to remove D.C. bias from the output signal of channel 2.

In the circuit embodiment of FIGURE 6, a force acting in the direction of forces $F_2$ or $F_2'$, as indicated in FIGURE 4, changes the resistance of elements 31, 32 and 33 equally. The equal changes in resistance of elements 31 and 33 produce equal changes in voltages across each of these elements respectively; hence, the voltage across leads 40 and 42 remains at a value of zero. However, the change in element 32 causes a change in D.C. voltage thereacross, and this change may be supplied through blocking capacitor 38 to the input of amplifying apparatus for channel 2 (not shown). The channel 1 output voltage remains unaffected thereby, since the voltages on leads 40 and 42 changes identically with voltage changes across element 32.

Any force acting either in the direction of forces $F_1$ or $F_1'$, as indicated in FIGURE 4, causes equal and opposite resistance changes in elements 31 and 33, while leaving element 32, situated on longitudinal axis 16 of face 15, unaffected. The equal and opposite changes in elements 31 and 33 produce a voltage across leads 40 and 42, in the circuit configuration of FIGURE 6, which varies in accordance with twice the voltage change across either of elements 31 or 33 separately. This voltage comprises the channel 1 output voltage of the pick-up device. No channel 2 output voltage is produced as a result of forces $F_1$ or $F_1'$. If crystal 10 is proportioned so that the change in resistance of any of elements 31–33 for a given amount of force $F_2$ is equal to the change in resistance of elements 31 or 33 in response to the same amount of force $F_1$, then any change in resistance of element 32, due to this given value of force $F_1$, produces a voltage drop which is twice the voltage drop which would be produced by either elements 31 or 33 separately in response to this given value of force $F_2$; hence, the latter voltage drop is equal to the voltage drop across elements 31 and 33 in series.

Figures 7, 8:
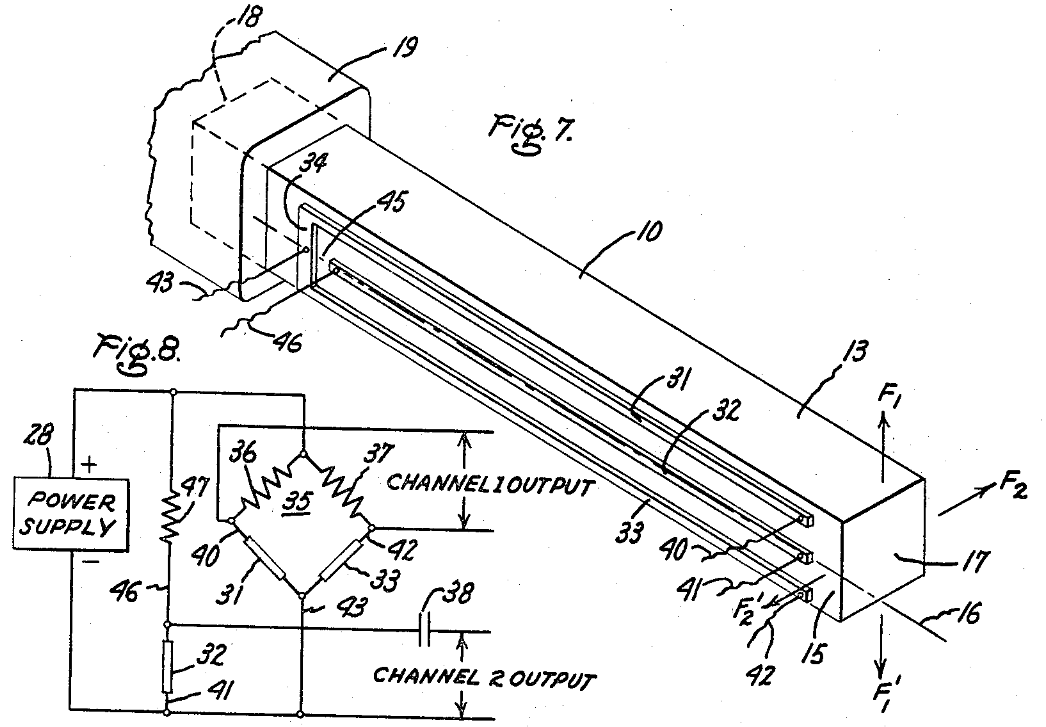
FIGURE 7 is an isometric view of a third embodiment of the invention.
FIGURE 8 is a circuit diagram showing how the embodiment of the invention illustrated in FIGURE 7 may be connected in an operative manner.

A modified version of the embodiment of the transducer shown in FIGURE 4 is illustrated in FIGURE 7. In this embodiment, element 32 is electrically isolated from elements 31 and 33, allowing additional versatility for connection to amplifying apparatus of stereophonic phonograph systems. The transducer device of FIGURE 7, therefore, differs from the device of FIGURE 4 only in that element 32 is formed electrically isolatedly from element 34 and a lead 46 is connected to the separated end of element 32. The resistances of elements 31, 32 and 33 are still substantially equal, since element 32 is separated from element 34 through only a short gap 45.

The device of FIGURE 7 may be connected as shown in FIGURE 8. Thus, elements 31 and 33 are connected in a bridge circuit configuration 35 with resistances 36 and 37, and channel 1 output voltages are still taken across leads 40 and 42 as in the circuit of FIGURE 6. However, element 32 is connected in series with a resistance 47 across power supply 28. Resistance 47 is selected to be equal in ohmic value to resistance 36 or 37. Since element 32 responds only to forces $F_2$ or $F_2'$, the channel 2 output of the circuit of FIGURE 8 is dependent only upon these forces. However, it should be noted that when crystal 10 is fabricated and proportioned in the manner described for FIGURE 4, with resistances 31, 32, and 33 all equal, the circuit of FIGURE 8 provides twice the output voltage for channel 1 as it does for channel 2. This is because changes in resistance of elements 31 and 33 occur in opposite directions, regardless of whether such changes are due to force $F_1$ or $F_1'$. Thus, when resistance of element 31 increases, resistance of element 33 decreases by an equal amount, and vice versa. For a given change in resistance of element 31 or 33, the change in channel 1 output voltage is twice that for channel 2 resulting from the same change in resistance of element 32, so that the channel 1 and channel 2 output voltages are in a 2 to 1 ratio. Further, current in resistance element 32 is independent of current in elements 31 and 33.

Figures 9, 10:
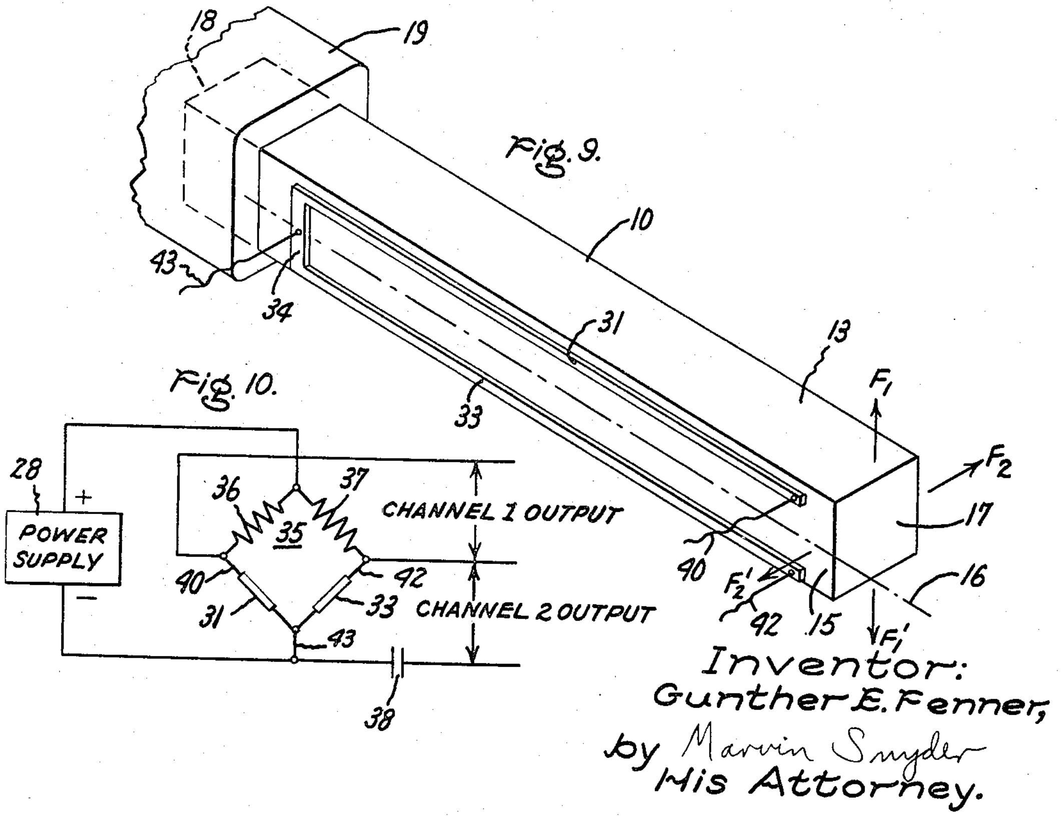
FIGURE 9 is an isometric view of a fourth embodiment of the invention.
FIGURE 10 is a circuit diagram showing how the embodiment of the invention illustrated in FIGURE 9 may be connected in an operative manner.

FIGURE 9 is a modified version of the embodiment of the stereophonic phonograph pick-up device of FIGURES 5 and 7, wherein element 32 is omitted altogether. Thus, only elements 31 and 33 are present on face 15 of crystal 10, spaced equally distant from centerline 16. These elements may be connected in a circuit configuration shown in FIGURE 10. Thus, elements 31 and 33, which are of equal resistance when undergoing zero strain, are connected in a bridge circuit configuration 35 with resistances 36 and 37, in a manner analogous to the circuit of FIGURE 3.

Operation of the circuit of FIGURE 10 is analogous to operation of the circuit of FIGURE 3, with the exception that the channel 1 output voltage is twice that of channel 2. Thus, output voltage for channel 1 is twice that for channel 2 for any given change in resistance of elements 31 and 33.

The foregoing describes a simplified stereophonic phonograph pick-up which permits optimization of transistorized circuitry in a phonograph reproducer. The stereophonic phonograph pick-up has a low generator impedance and is simple in construction, allowing it to be mass produced quickly and simply. Versatility is added by virtue of the various possible configurations in which the device may be fabricated.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. A force sensing device comprising: a semiconductor crystal having a plurality of faces, one of said faces lying in a plane which is both perpendicular to the direction of a first of two forces applied to said device and parallel to the direction of the second of said forces; and at least two parallel strips directed longitudinally along said one face orthogonally to the direction of each of said forces, said strips comprising low resistivity portions of said semiconductor crystal and being situated with respect to said forces such that the resistance values of said strips are affected identically in response to the first of said forces and differently in response to the second of said forces.

2. The force sensing device of claim 1 wherein one of said parallel strips is displaced from the longitudinal axis of said one face and the other of said strips is situated along the longitudinal axis of said one face.

3. The force sensing device of claim 2 including circuit means connecting said strips as adjacent legs of a four-legged bridge, means providing current to each of said adjacent legs, means sensing net voltage across said adjacent legs, and means sensing changes in voltage across the leg corresponding to the strip situated along the longitudinal axis of said one face.

4. The force sensing device of claim 1 wherein each of said parallel strips is displaced on either side of the longitudinal axis of said one face of said crystal respectively.

5. The force sensing device of claim 4 including circuit means connecting said strips as adjacent legs of a four-legged four-terminal bridge, means providing current to each of said adjacent legs, means sensing net voltage across said adjacent legs at two diametrically opposite terminals of said bridge, and means sensing changes in current flow through either of said legs.

6. The force sensing device of claim 1 wherein each of said low resistivity portions of said crystal is lower in resistivity than the remainder of said crystal by a factor of at least $10^4$.

7. The force sensing device of claim 1 including a third parallel strip directed longitudinally along said one face, one of said strips being situated along the longitudinal axis of said one face and the other two of said parallel strips being displaced on either side of the longitudinal axis of said one face respectively.

8. The force sensing device of claim 7 wherein each of said low resistivity portions of said crystal is lower in resistivity than the remainder of said crystal by a factor of at least $10^4$.

9. A force sensing device comprising: a semiconductor crystal having a plurality of faces, one of said faces lying in a plane which is both perpendicular to the direction of a first of two forces applied to said device and parallel to the direction of the second of said forces; a pair of parallel strips directed longitudinally along said one face orthogonally to the direction of each of said forces and displaced respectively on either side of the longitudinal axis of said one face, and a third strip directed longitudinally along said one face parallel to said pair of strips and situated along the longitudinal axis of said one face, each of said strips comprising highly doped segments of said semiconductor crystal; and means connecting said pair of strips so that the total resistance of said pair of strips changes additively in response to application of the first of said forces and subtractively in response to application of the second of said forces.

10. The force sensing device of claim 9 including circuit means connecting said pair of strips as adjacent legs of a four-legged, four-terminal bridge, means sensing net voltage across said adjacent legs of said bridge, means connecting said third strip to the bridge terminal common to said pair of strips, power supply means connected in series with said third strip and the diametrically opposite terminal of said common terminal of said bridge, and means sensing changes in voltage across said third strip.

11. The force sensing device of claim 9 wherein said pair of strips are connected as adjacent legs of a four-legged four-terminal bridge, means sensing net voltage across said adjacent legs at two diametrically opposite terminals of said bridge, power supply means connected to the remaining terminals of said bridge, means coupling substantially constant current through said third strip, and means sensing changes in voltage across said third strip.

12. The force sensing device of claim 9 wherein each of said highly doped segments of said semiconductor crystal is lower in resistivity than the remainder of said crystal by a factor of at least $10^4$.

References Cited

UNITED STATES PATENTS

| | | | |
|---|---|---|---|
| 3,012,192 | 12/1961 | Lion | 323—75 X |
| 3,108,161 | 10/1963 | Tourtellot | 310—8.5 X |
| 3,124,769 | 3/1964 | Peterson | 338—2 |
| 3,144,522 | 8/1964 | Bernstein | 179—100.41 |
| 3,186,217 | 6/1965 | Pfann | 338—5 X |
| 3,360,609 | 12/1967 | Fenner | 179—100.41 |

JOHN F. COUCH, *Primary Examiner.*

G. GOLDBERG, *Assistant Examiner.*

U.S. Cl. X.R.

179—100.41; 310—8.5, 8.7; 338—5, 14